(12) United States Patent
Harris et al.

(10) Patent No.: US 11,498,162 B2
(45) Date of Patent: Nov. 15, 2022

(54) HEAT EXCHANGER TUBE WITH FLATTENED DRAINING DIMPLE

(71) Applicant: Johnson Controls Technology Company, Auburn Hills, MI (US)

(72) Inventors: William M. Harris, Norman, OK (US); Curtis A. Trammell, Newcastle, OK (US); Danielle R. Rosendale, Norman, OK (US); David C. Rimmer, Newcastle, OK (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 260 days.

(21) Appl. No.: 16/146,736

(22) Filed: Sep. 28, 2018

(65) Prior Publication Data

US 2020/0094358 A1 Mar. 26, 2020

Related U.S. Application Data

(60) Provisional application No. 62/734,675, filed on Sep. 21, 2018.

(51) Int. Cl.
| | |
|---|---|
| *F28F 1/02* | (2006.01) |
| *F24F 13/22* | (2006.01) |
| *B23P 15/26* | (2006.01) |
| *B21D 53/06* | (2006.01) |
| *B21D 22/04* | (2006.01) |

(52) U.S. Cl.
CPC ............. *B23P 15/26* (2013.01); *B21D 53/06* (2013.01); *F24F 13/222* (2013.01); *F28F 1/025* (2013.01); *B21D 22/04* (2013.01); *F28F 2001/027* (2013.01); *F28F 2250/00* (2013.01)

(58) Field of Classification Search
CPC .. F28F 1/025; F28F 2001/027; F28F 2250/00; F28F 1/02
See application file for complete search history.

(56) References Cited

U.S. PATENT DOCUMENTS

| | | | | |
|---|---|---|---|---|
| 5,094,224 | A | * | 3/1992 | Diesch ...................... F28F 1/42 126/11 OR |
| 7,255,155 | B2 | | 8/2007 | Donnell et al. |
| 8,307,669 | B2 | | 11/2012 | Taras et al. |

(Continued)

FOREIGN PATENT DOCUMENTS

| | | | |
|---|---|---|---|
| EP | 1183491 B1 | 3/2004 | |
| JP | 61059194 A * | 3/1986 | ......... F28D 1/05375 |

(Continued)

OTHER PUBLICATIONS

Translation of Japanese Patent Document JP-61059194-A entitled Translation-JP 61059194 A (Year: 2020).*

*Primary Examiner* — Paul Alvare
(74) *Attorney, Agent, or Firm* — Fletcher Yoder, P.C.

(57) ABSTRACT

A heat exchanger includes a tube having a length and an outside boundary. The tube is configured to convey fluid therethrough to facilitate heat transfer, and the outside boundary of the tube having a bottom wall portion, a top wall portion opposing the bottom wall portion, and two side wall portions between the bottom wall portion and the top wall portion, in which a segment of the length of the tube has a plurality of dimples selectively placed outside of the bottom wall portion.

17 Claims, 7 Drawing Sheets

(56) References Cited

U.S. PATENT DOCUMENTS

| | | | |
|---|---|---|---|
| 8,459,342 B2 * | 6/2013 | O'Donnell | F24H 9/0026 |
| | | | 165/109.1 |
| 9,074,820 B2 | 7/2015 | Hayasaka et al. | |
| 9,243,851 B2 | 1/2016 | Viswanathan et al. | |
| 9,360,258 B2 | 6/2016 | Bronicki et al. | |
| 9,791,213 B2 | 10/2017 | Yoshioka et al. | |
| 10,345,053 B2 | 7/2019 | Amaya et al. | |
| 2007/0287334 A1 | 12/2007 | Yagisawa et al. | |
| 2010/0294474 A1 * | 11/2010 | Hirota | F28F 13/08 |
| | | | 165/182 |
| 2011/0000657 A1 * | 1/2011 | Ruckwied | F28F 1/42 |
| | | | 165/181 |
| 2014/0196872 A1 * | 7/2014 | Anwar | F28F 1/10 |
| | | | 165/109.1 |
| 2016/0109188 A1 | 4/2016 | Juliana et al. | |
| 2018/0023895 A1 | 1/2018 | Kraft et al. | |

FOREIGN PATENT DOCUMENTS

| | | |
|---|---|---|
| JP | 7190661 | 7/1995 |
| NL | 307030 A1 * | 8/1988 |

\* cited by examiner

HEAT EXCHANGER TUBE WITH FLATTENED DRAINING DIMPLE

CROSS REFERENCE TO RELATED APPLICATIONS

This application claims priority from and the benefit of U.S. Provisional Application Ser. No. 62/734,675, entitled "HEAT EXCHANGER TUBE WITH FLATTENED DRAINING DIMPLE," filed Sep. 21, 2018, which is hereby incorporated by reference in its entirety for all purposes.

BACKGROUND

The disclosure relates generally to heating, ventilating, and air conditioning (HVAC) systems, and specifically, to heat exchanger tubing.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an air flow delivered to and ventilated from the environment. For example, a heating, ventilating, and air conditioning (HVAC) system may use heat exchangers to enable a heat exchange relationship between the air flow and a fluid to change the temperature of the air flow. The heat exchangers may use tubing to establish the heat exchange relationship.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heat exchanger includes a tube having a length and an outside boundary. The tube is configured to convey fluid therethrough to facilitate heat transfer, and the outside boundary of the tube having a bottom wall portion, a top wall portion opposing the bottom wall portion, and two side wall portions between the bottom wall portion and the top wall portion, in which a segment of the length of the tube has a plurality of dimples selectively placed outside of the bottom wall portion.

In one embodiment, a heat exchanger, includes a tube having a length and an outside boundary. The tube is configured to convey fluid therethrough to transfer heat, and the outside boundary of the tube includes a bottom wall portion, a top wall portion opposing the bottom wall portion, and two side wall portions between the bottom wall portion and the top wall portion. A segment of the length of the tube has alternating regions along its length of un-deformed outside boundary regions which are circumferential and deformed regions which extend from the exterior to the interior, such deformed regions being selectively placed outside of the bottom wall portion.

In one embodiment, a method of forming a length of a tube segment of a heat exchanger includes selectively forming dimples outside of the side portions. The tube segment includes a bottom portion, a top portion opposing the bottom portion, and two side portions between the bottom portion and the top portion. The bottom portion, the top portion, and the side portions all extend along the length of the tube segment.

In one embodiment, a heat exchanger for a heating, ventilation, and air conditioning (HVAC) system, includes a tube configured to convey fluid therethrough to facilitate heat transfer between the fluid and surroundings of the tube. The tube includes a first portion comprising a circumferential boundary, a second portion adjacent to the first portion along a length of the tube, and a deformed boundary segment of the second portion extending beyond the circumferential boundary relative to an interior of the tube and a substantially un-deformed boundary segment of the second portion in substantial alignment with the circumferential boundary of the first portion. The second portion further includes a plurality of dimples disposed along a length of the second portion;

DRAWINGS

Various aspects of this disclosure may be better understood upon reading the following detailed description and upon reference to the drawings in which.

DETAILED DESCRIPTION

Figure 1:
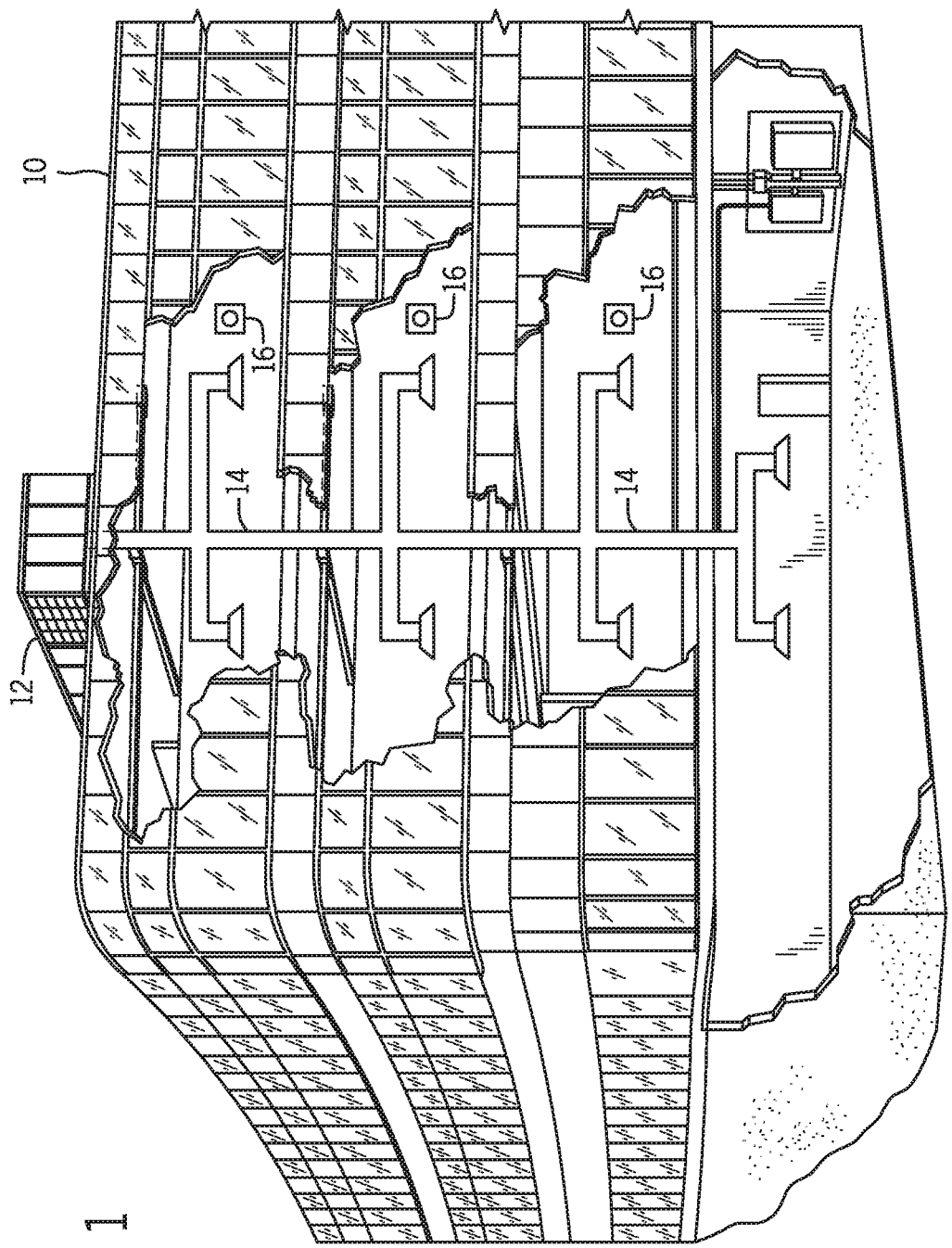
FIG. 1 is a schematic of an environmental control for building environmental management that may employ one or more HVAC units, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilating, and air conditioning (HVAC) systems that use a heat exchanger for changing the temperature of air flowing through the HVAC system. The heat exchanger may establish a heat exchange relationship between the airflow and a fluid, such as a combusted gas. For example, the heat exchanger may use tubing for directing the fluid therethrough while the airflow flows across the tubing. The tubing places the airflow and the fluid in thermal communication with one another such that heat exchanges between the airflow and the fluid. More heat may be exchanged when the fluid flows within the tubing in a slower and more turbulent manner and thus, the efficiency of the heat exchanger increases. Indenting the tubing walls with dimples to decrease the cross-sectional area of the tube may cause the fluid to flow in such a manner. Generally, as the cross-sectional area of the tube at the dimple's most restrictive point decreases and as the number of dimples that are formed along a length of a segment of tubing increases, the heat exchanged between the airflow and the fluid increases.

Traditionally, dimples may be oval indentations in the tubing walls. The dimples may be positioned such that a length of the dimples is longitudinal or co-directional with an axial direction of the tubing. However, a greater quantity of dimples may be placed along the length of the tubing if the dimples are positioned such that the length of the dimples is lateral or crosswise to the axial direction of the tubing. Thus, in accordance with certain embodiments of the present disclosure, it is presently recognized that the efficiency of a heat exchanger may increase by modifying heat exchanger tubing via flattening a portion or side of the tubing and forming the dimples in the tube, such that the length of the dimples is lateral or crosswise to the axial direction of the tubing. Furthermore, flattening a portion of the tubing during dimple formation may reduce collection of condensation or other liquid within the tubing. In other words, present embodiments include tubing with crosswise dimples formed therein and a flat side of the tubing that enables condensation or other liquid within in the tubing to drain properly. Forming the dimples may include embossing (e.g., pressing, pinching, or punching) the tube segment and may be performed by a roller or multiple rollers configured to provide consistent or controlled spacing of dimples along the tubing.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
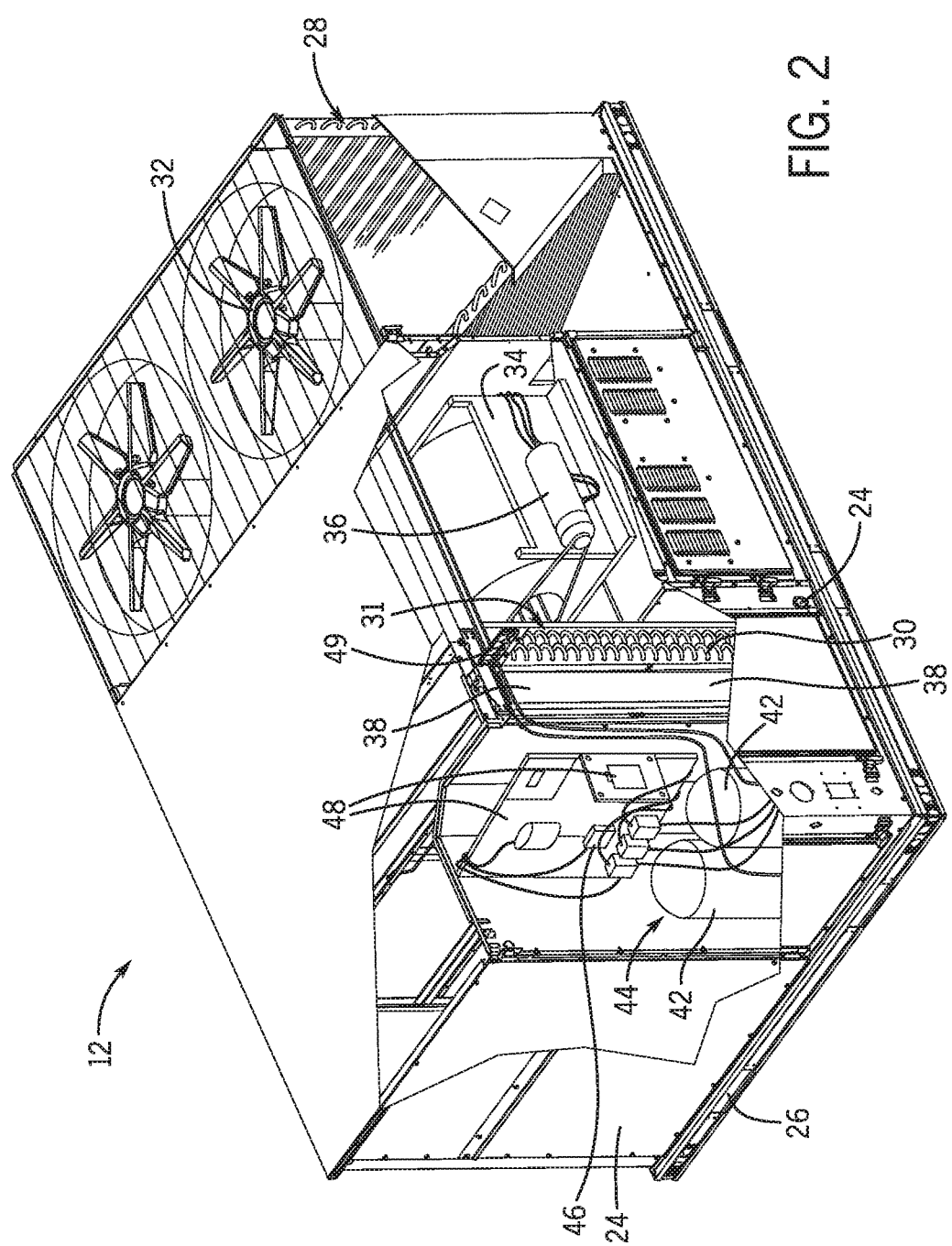
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits.

Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
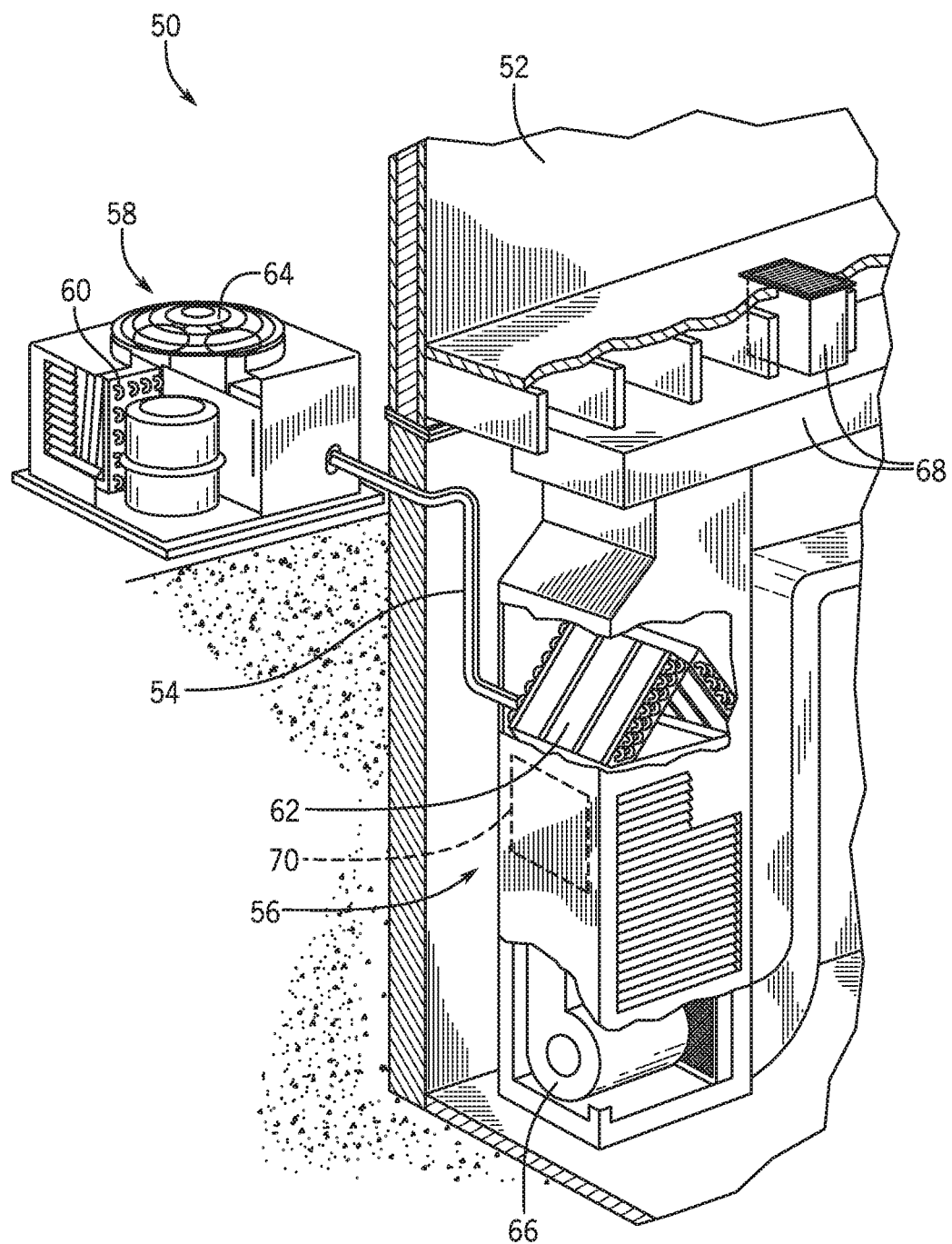
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
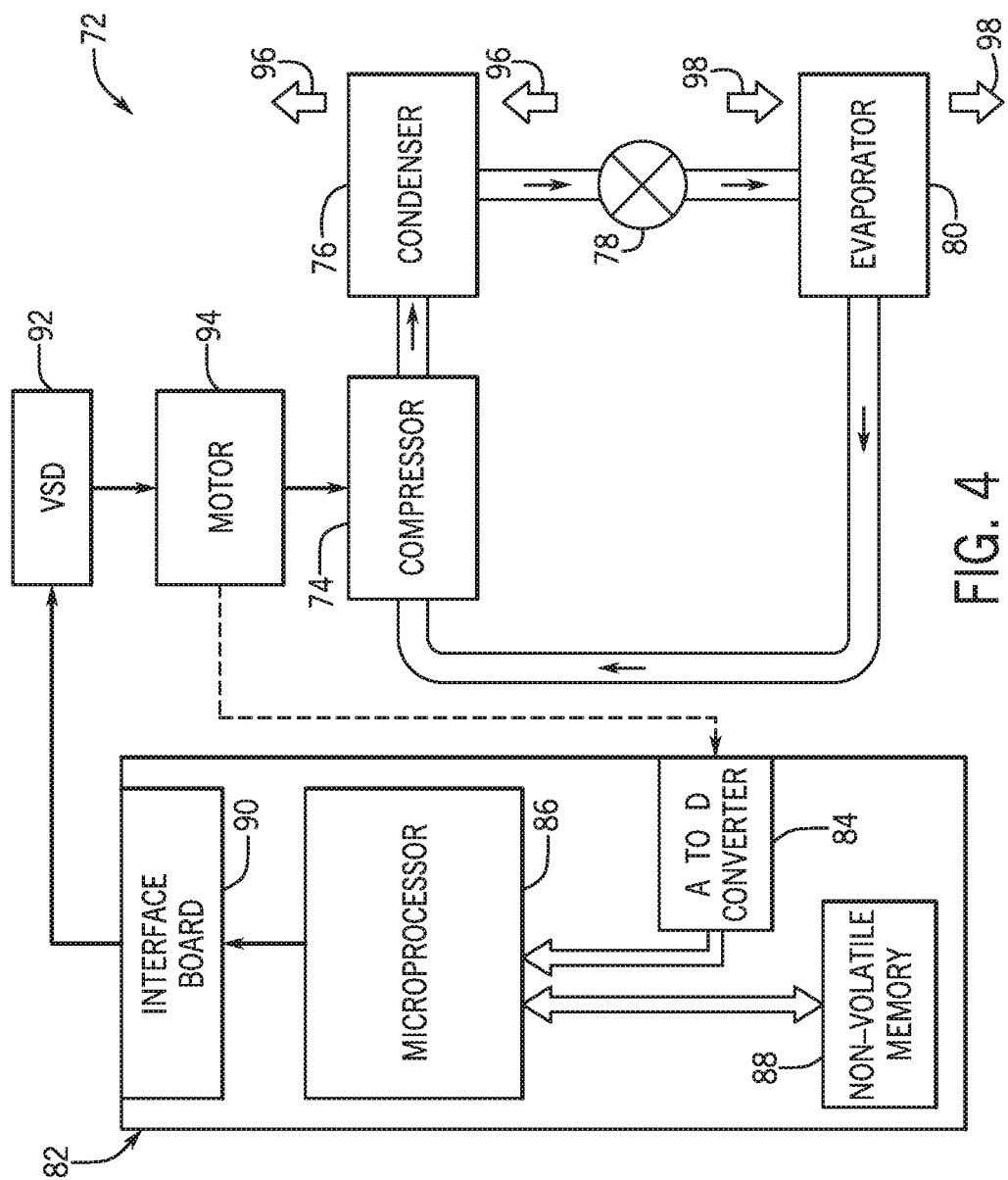
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As noted above, air may flow through an HVAC system, where the temperature of the air may be changed by flowing the air through or across a heat exchanger, such as across heat exchanger tubing. The heat exchanger may use a fluid that flows through the tubing to exchange heat with the airflow. To create a more turbulent and slower fluid flow within the tubing, which allows for more heat to exchange between the airflow and the fluid, the heat exchanger may include dimples positioned along a segment of a tube to restrict or reduce the cross-section of the segment of the tube. In accordance with present embodiments, the heat exchanger tubing may be flattened on one side such that dimples may be formed with the respective lengths of the dimples positioned crosswise or laterally to the axial direction of the tube. As such, a higher quantity of dimples may be formed into the tubing than if the respective lengths of the dimples were positioned longitudinally or co-directionally with the axial direction of the tube. The greater number of dimples may enable an even more turbulent and slower flow of the fluid within the tube, thereby increasing the efficiency of the heat exchanger. Flattening the heat exchanger tubing may also decrease the amount of resistance encountered by the air flowing across the heat exchanger tubing by decreasing the upstream size or area of the tubing relative to the airflow. As such, a pressure drop of the airflow directed across the heat exchanger tubing may be limited. Additionally, tubing that includes a flattened portion on a side may enable drainage of liquid, such as condensation, that may accumulate during operation of the heat exchanger and/or during operation of a cooling system upstream of the heat exchanger. For purposes of discussion, the present disclosure will refer to tubing utilized in a heat exchanger of a furnace in an HVAC unit. However, it should be appreciated that flattened tubing may be used in other heat exchangers that use tubing and in other types of HVAC systems, such as a rooftop unit.

Figure 5:
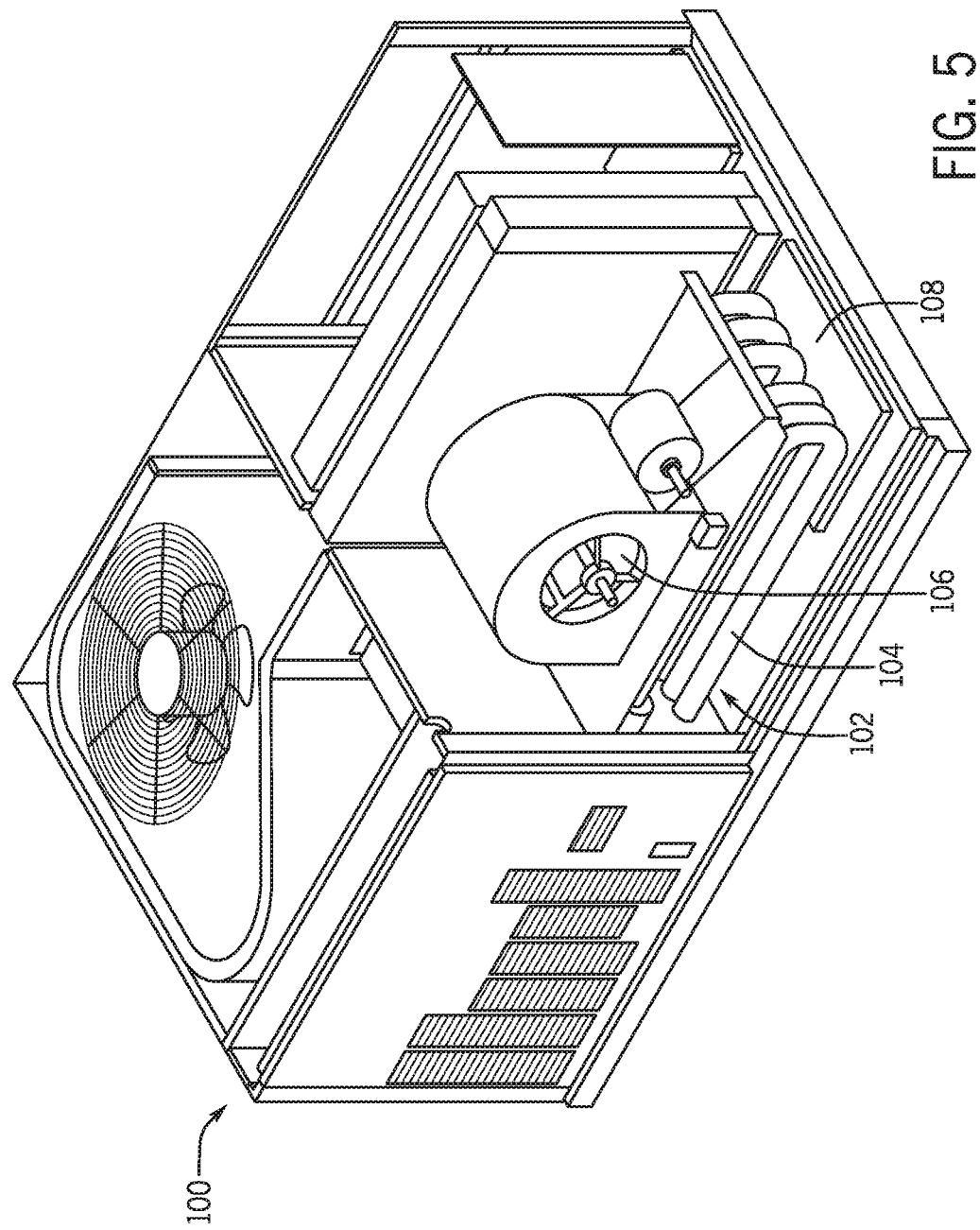
FIG. 5 is a perspective view of an embodiment of an HVAC unit, in accordance with an aspect of the present disclosure.

In accordance with present embodiments, FIG. 5 is a perspective view of an HVAC unit 100 that includes a heat exchanger 102 to heat air flowing through the HVAC unit 100. The heat exchanger 102 includes tubing 104 that encloses a heating fluid, such as a combustible gas or a refrigerant, to heat the airflow. For example, the heat exchanger 102 may be coupled to a heat source, such as a burner assembly, via the tubing 104, such that the heat source directs the heating fluid into the tubing 104. The heating fluid may include a combustible gas generated from a fuel, such as acetylene, natural gas, propane, another gas, or any combination thereof. The heating fluid then flows within the tubing 104. At the same time, the airflow flows across the tubing 104. Heat is exchanged between the airflow and the heating fluid within the tubing 104, such as via conduction through the walls of the tubing 104. In this manner, heat may be transferred from the heating fluid to the airflow to increase the temperature of the airflow. The heat exchanger 102 may pose a resistance to the airflow and the airflow may experience a pressure drop when passing over the tubing 104 of the heat exchanger 102. The unit 100 includes a blower 106 that increases the velocity of the airflow prior to flowing across the heat exchanger 102. The blower 106 directs the airflow towards an outlet 108 downstream of the heat exchanger 102 to direct the airflow to rooms or other areas in a building, such as the building 10 in FIG. 1. As such, the airflow may heat the rooms or areas of the building 10. As shown in FIG. 5, the heat exchanger 102 includes several segments of tubing 104 through which the heading fluid may flow.

Figure 6:
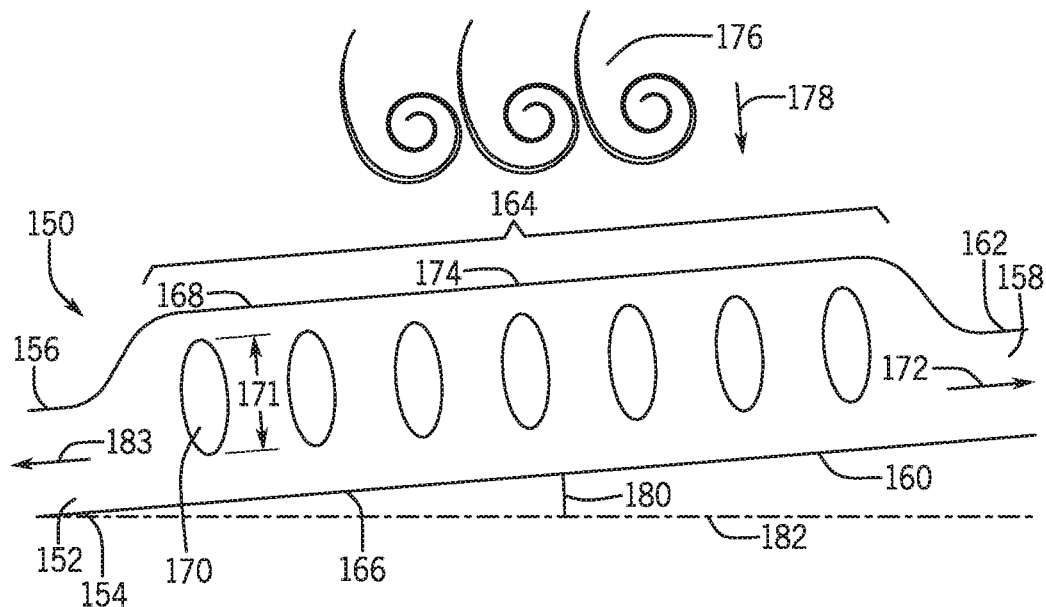
FIG. 6 is a side view of an embodiment of a tube segment that may be used in a heat exchanger, in accordance with an aspect of the present disclosure.

An example of a segment of the tubing 104 of the heat exchanger 102 is illustrated in FIG. 6, which is a side view of an embodiment of a tube segment 150 of the heat exchanger 102. The tube segment 150 include an inlet 152 where the heating fluid may enter the tube segment 150. The inlet 152 includes a bottom portion 154 of the tube segment 150 and a top portion 156 of the tube segment 150. Each portion may be defined by a wall portion of the tube segment 150 and the relative positioning may be defined by gravity. For example, top and bottom may refer to relative positioning with respect to gravity. The tube segment 150 also includes an outlet 158 where the heating fluid may exit the tube segment 150. The outlet 158 also includes a bottom portion 160 and a top portion 162. The bottom portion 154 of the inlet 152 may be substantially coaxial or aligned with the bottom portion 160 of the outlet 158, and the top portion 156 of the inlet 152 may be substantially coaxial or aligned with the top portion 162 of the outlet 158. As such, a cross-sectional area of the inlet 152 and a cross-sectional area of the outlet 158 may substantially be the same. Indeed, the cross-sectional area of the tubing segment 150 may be unmodified at the inlet 152 and the outlet 158. In between the inlet 152 and the outlet 158, the tube segment 150 includes a flattened portion 164 connecting the inlet 152 and the outlet 158. The flattened portion 164 includes a bottom portion 166 and a top portion 168. The bottom portion 166 may be substantially aligned with the bottom portion 154 and the bottom portion 160, but the top portion 168 may be offset from the top portion 156 and the top portion 162. That is, the top portion 168 may be offset such that a distance from the bottom portion 166 to the top portion 168 of the flattened portion 164 is greater than a distance from the bottom portion 154 to the top portion 156 of the inlet 152 and greater than a distance from the bottom portion 160 to the top portion 162 of the outlet 158.

In addition, a cross-sectional area of the flattened portion 164 may be different than the cross-sectional area of the inlet 152 and the cross-sectional area of the outlet 158. For example, the bottom portion 154 of the inlet 152 and the bottom portion 160 of the outlet 158 may each have generally arcuate, semi-circular, or teardrop shaped cross-sectional profiles. In other words, the bottom portion 154 of the inlet 152 and the bottom portion 160 of the outlet 158 may each have a substantially un-deformed circumferential boundary. In some embodiments, the bottom portion 166 of the flattened portion 164 may also have a generally arcuate, semi-circular, or tear drop shaped cross-sectional profile and/or a substantially un-deformed circumferential boundary. However, while the top portion 156 of the inlet 152 and the top portion 162 of the outlet 158 may have arcuate, semi-circular, or teardrop shaped cross-sectional profiles, or a substantially un-deformed circumferential boundary, the top portion 168 of the flattened portion 164 may have a different cross-sectional profile by virtue of the formation of dimples 170 formed in the flattened portion 164 using the techniques disclosed herein. For example, the top portion 168 of the flattened portion 164 may have an elliptical cross-sectional profile. In other words, the top portion 168 may have an arc portion that extends radially outward from the circumferential boundary.

Several dimples 170 may be formed along the flattened portion 164. As illustrated in FIG. 6, the dimples 170 may be an oval shape with a dimple length 171 lateral or crosswise to an axial direction 172 of the tube segment 150. The dimples 170 may be formed via pressing, punching, flattening, any other suitable method, or any combination thereof. The dimples 170 indent the walls of the tube segment 150 such that the cross-sectional area or width of the tube segment 150 is reduced at the flattened portion 164. In some embodiments, the dimples 170 may be placed in opposing pairs such that the dimples 170 are placed on opposite sides of the tube segment 150 at the same axial position of the tube segment 150. In other embodiments, the dimples 170 may be placed in offset pairs such that dimples 170 are placed on opposite sides of the tube segment 150 at different axial positions along the tube segment 150. A combination of opposing dimple pairs and offset dimple pairs may also be disposed on the tube segment 150. Although the dimples 170 in FIG. 6 are illustrated to be an oval shape, in other embodiments, the dimples 170 may be another shape, such as a rectangle, a diamond, an irregular shape, or any other suitable shape. Furthermore, the dimples 170 in FIG. 6 are illustrated to have the same general profile, but in other embodiments, the dimples 170 may be of different shapes and profiles relative to one another. For example, the dimples 170 may have different respective dimple lengths 171. Additional embodiments may also include a different number of the dimples 170 than depicted in FIG. 6. For example, although FIG. 6 illustrates one continuous length of the flattened portion 164 having the dimples 170, in other embodiments, the tube segment 150 may include several flattened portions 164, each including sets of dimples 170.

As mentioned, heating fluid, such as combustion products, may flow within the tube segment 150 in the axial direction 172 from the inlet 152 through the flattened portion 164 to the outlet 158. The heating fluid may flow into and through the inlet 152 at a steady stream, such as in laminar flow. At this steady stream, the heating fluid may include a thermal boundary layer which may block heat from being transferred to a wall 174 of the tube segment 150, such as at the top portion 168. When the heating fluid enters the flattened portion 164, the heating fluid may encounter the dimples 170 that reduce the cross-sectional area or width of the tube segment 150 at the flattened portion 164. The reduction in cross-sectional area or width may disrupt the laminar flow of the heating fluid to induce turbulent flow. The turbulent flow may break up the thermal boundary layer of the heating fluid and therefore increase the amount of heat that transfers to the wall 174 to increase the temperature of the wall 174. In addition, the disruption in the flow of the heating fluid may induce features, such as flow vortices and flow separation and reattachment, that further increasing heat exchange between the heating fluid and the wall 174. As discussed above, positioning of the dimples 170 such that the respective dimple lengths 171 are lateral or crosswise to the axial direction 172 rather than longitudinal to the axial direction 172 may result in a greater quantity of dimples 170 along the flattened portion 164. The greater quantity of dimples 170 placed along the tube segment 150 may induce a greater disruption in the flow of the heating fluid.

External to the tube segment 150, an airflow 176 may be directed to flow across the tube segment 150 in the direction 178. As noted before, heat may be exchanged between the heating fluid and the wall 174, such that the wall 174 increases temperature. Therefore, as the airflow 176 flows across the tube segment 150 to be in contact with the wall 174, heat transfers from the wall 174 to the airflow 176 to increase the temperature of the airflow 176. As heat transfers from the heating fluid to the wall 174 to the airflow 176, the temperature of the heating fluid may decrease. As a result, condensation may be formed within the tube segment 150. In certain embodiments, condensation may also be formed within the tube segment 150 when a cooling system upstream of the heat exchanger 100 is operating. That is, the heat exchanger 100 may not be operating to direct heating fluid, but some fluid may still remain within the tube segment 150. Additionally, the tube segment 150 may be cooled by operation of the cooling system upstream of the heat exchanger 100. Thus, condensation may form when the fluid within the tube segment 150 condenses via cooling of the tube segment 150. To enable draining of the condensation, the tube segment 150 may be inclined at an angle 180 with respect to a flat ground or reference plane 182. For example, the tube segment 150 may be disposed at the angle 180 within the HVAC unit 100, where the flat ground or reference plane 182 is a base of the HVAC unit 100. In some embodiments, the angle may range from 1 to 15 degrees. In this manner, the condensation may drain via gravity by flowing down the tube segment 150 in the direction 183. Since the bottom portions 154, 166, and 160 are substantially coaxial or aligned with one another, the condensation may flow through the tube segment 150 in a smooth and unobstructed flow, without an accumulation of the condensation at a portion or section of the tube segment 150. In other words, the common arcuate, semi-circular, tear drop shaped, or substantially un-deformed cross-sectional profile of the bottom portions 154, 166, and 160 may enable the condensation to flow through and exit the tube segment 150 in a smooth and unobstructed flow.

Figure 7:
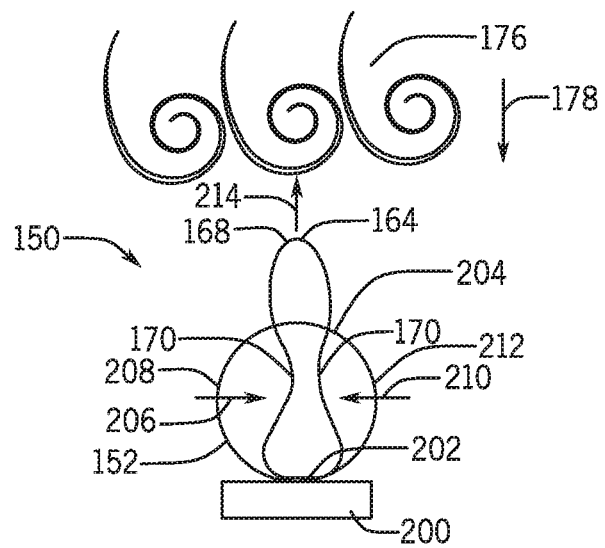
FIG. 7 is an axial view of an embodiment of the tube segment of FIG. 6, in accordance with an aspect of the present disclosure.

To manufacture the flattened portion 164 such that the bottom portions 154, 166, and 160 are substantially coaxial, aligned, arcuate, semi-circular, or tear drop shaped, the bottom portions 154, 166, and 160 may be constrained during forming of the dimples 170. To illustrate an embodiment of the manufacturing process, FIG. 7 is an axial view of an embodiment of the tube segment 150. As illustrated in FIG. 7, the tube segment 150 includes the inlet 152 that includes a substantially circular cross-sectional profile, or a substantially un-deformed circumferential boundary, and the tube segment 150 includes the flattened portion 164 that includes deformations and/or a reduction in cross-sectional width. Prior to forming of the flattened portion 164, the tube segment 150 may include the circular cross-sectional profile or substantially un-deformed circumferential boundary of the inlet 152 throughout its entire length. During the forming process, the tube segment 150 may be constrained by a blocking element 200 on a first or bottom portion 202 but may be unconstrained on a second or top portion 204 opposite the bottom portion 202. For example, the blocking element 200 may be a clamp, brace, vice, table, plate, another suitable device, or any combination thereof. Dimples 170 may then be formed by indenting the tube segment 150 in the direction 206 at a third side, arc segment, or lateral portion 208 and in the direction 210 at a fourth side, arc segment, or lateral portion 212 of the tube segment 150. During indentation of the tube segment 150, the top portion 204 may deform in the direction 214 to create the flattened portion 164 having an elliptical cross-sectional profile or an arc segment that extends radially beyond the circumferential boundary of the tube segment 150. However, the bottom portion 202 may be constrained by the blocking element 200 and thus, deformation of the bottom portion 202 is substantially blocked. As a result, the bottom portion 202 may not change in shape or geometry during forming of the dimples 170. For example, the bottom portion 202 may retain an arcuate, semi-circular, or tear drop shaped cross-sectional profile and/or the bottom portion 202 may remain aligned with the circumferential boundary of the tube segment 150. The bottom portion 202 may also be generally flattened in a direction generally transverse to gravity and/or airflow 176, as generally illustrated in FIG. 7

As mentioned before, the flattening portion 164 may include a shape that decreases resistance for when the airflow 176 flows in the direction 178 across the tube segment 150. As illustrated in FIG. 7, the top portion 168 of the flattened portion 164 is smaller than the top portion 204 of the inlet 152, which is a length of the tube segment 150 that is not flattened. More specifically, the top portion 168 has an elliptical cross-sectional profile, whereas the top portion 204 of the inlet 152 has an arcuate or semi-circular profile that is aligned with the circumferential boundary of the tube segment 150. As such, when the airflow 176 flows across the tube segment 150, there is less area of the tube segment 150 blocking the airflow 176. The decrease in resistance may also result in a reduction in pressure drop of the airflow 176 flowing across the tube segment 150. Therefore, a blower, such as the blower 106, may operate as a lower power, saving in energy costs.

In addition to reducing airflow resistance and enabling lateral positioning of the dimples 170, the flattened portion 164 may provide other benefits as well. For example, tube segments 150 may be placed more proximate to one another because of the reduced cross-sectional area or width, and therefore, an increased number of tubes that may be placed in a heat exchanger. Moreover, the flattened portion 164 may enable coupling of other components onto each tube segment 150, such as fins and/or baffles by increasing the area at the sides, such as the lateral portion 208 and the lateral portion 212, of the tube segment 150.

Although FIG. 7 illustrates the tube segment 150 as having a circular cross sectional area or profile prior to deformation, in some embodiments, the cross-sectional area may be of a different shape. For example, the cross-sectional area may be a rectangular shape or another shape that enables deformation to reduce the cross-sectional area.

Figure 8:
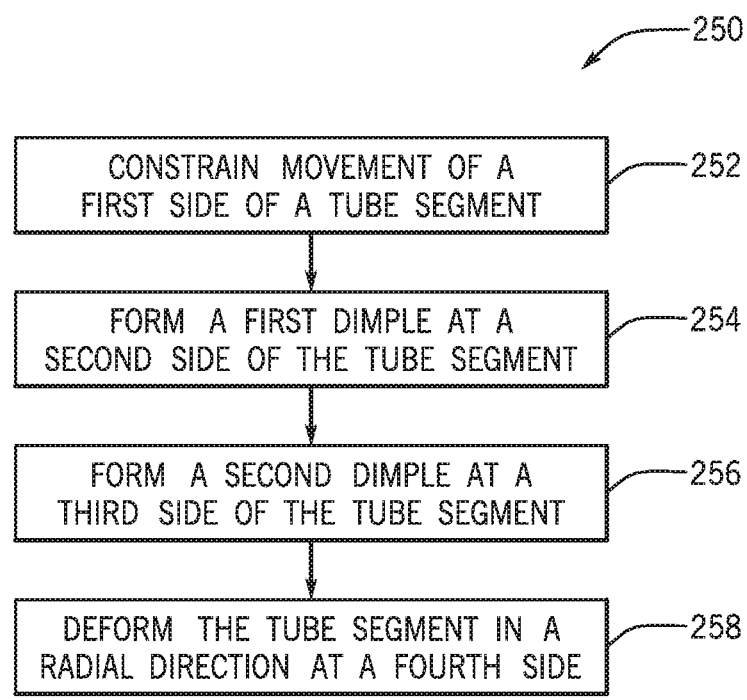
FIG. 8 is an embodiment of a method to form dimples in a tube segment of a heat exchanger, in accordance with an aspect of the present disclosure.

To further illustrate the process to manufacture the flattened portion 164, FIG. 8 is an embodiment of a method 250 to form dimples 170 in a tube segment 150 that may flow a fluid. In block 252, the tube segment 150 is positioned such that a first side, arc segment, or bottom portion 202 of the tube segment 150 is constrained from moving or deforming. As mentioned before, the tube segment 150 may be constrained via a clamp, brace, vice, or any other suitable device. The tube segment 150 may be constrained at a wall at the bottom portion 202 such that walls at the other sides or portions remain exposed and are able to move or deform. For example, constraining the bottom portion 202 may retain an arcuate, semi-circular, or tear drop shaped cross-sectional profile of the bottom portion 202 of the tube segment 150. In other words, constraining the bottom portion 202 may leave the bottom portion 202 substantially un-deformed, such that the bottom portion 202 remains aligned with the circumferential boundary of the tube segment 150

In block 254, a first dimple is formed at a second side, arc segment, or lateral portion 208 of the tube segment 150, which may be lateral to the bottom portion 202 of the tube segment 150. The first dimple may be of any suitable shape to reduce the cross-sectional width of the tube segment 150 and effectively induce turbulent flow of fluid within the tube segment 150. In some embodiments, the first dimple may include a dimple length which is positioned lateral or cross-wise to an axial length of the tube segment 150. As discussed above, the first dimple may be formed via pressing, punching, drilling, flattening, any other suitable method, or any combination thereof.

In block 256, a second dimple is formed at a third side, arc segment, or lateral portion 212 of the tube segment 150. The third side, arc segment, or lateral portion 212 of the tube segment 150 may be opposite the second side, arc segment, or lateral portion 208 of the tube segment 150. As such, the first dimple and the second dimple are positioned on opposite sides of one another. In some embodiments, the second dimple may be positioned directly opposite of the first dimple, but in other embodiments, the second dimple may be offset a length along the tube segment 150 compared to the first dimple. Further, the second dimple and the first dimple may be of different or substantially the same geometries. As such, a dimple length of the second dimple may also be positioned lateral to the length of the tube segment 150. However, in additional embodiments, the dimple length of the second dimple may be positioned longitudinally or in a different direction compared to the axial length of the tube segment 150. Forming the second dimple may be the same process as forming the first dimple and in some embodiments, may be performed simultaneously with forming the first dimple.

In block 258, the tube segment 150 is deformed in a radial and outward direction at a fourth side, arc segment, or top portion 204. As discussed above, the geometry of the dimples 170 may include a dimple length 171 that is positioned lateral to the axial length of the tube segment 150. Thus, indenting the tube segment 150 to form the dimples 170 may push the tube segment 150 radially outwards in directions crosswise to the lateral portions 208, 212. Since the bottom portion 202 of the tube segment 150 is constrained from moving, the tube segment 150 may deform in a radial direction opposite the bottom portion 202. In other words, the tube segment 150 may deform at the top portion 204. For example, the top portion 204 may deform from an arcuate cross-sectional profile aligned with the circumferential boundary to an elliptical cross-sectional profile that extends beyond the circumferential boundary. The section of the tube segment 150 that includes the deformed top portion 204 is a flattened portion 164 of the tube segment 150. To facilitate deformation without degrading the material of the tube segment 150, the tube segment 150 may be made of a malleable material that enables plastic deformation, such as a metal, a metal alloy, a polymer, another suitable material, or any combination thereof.

The method 250 may be performed multiple times along the tube segment 150 such that multiple dimples 170 are formed at the lateral portions 208, 212 of the tube segment 150. In some embodiments, the method 250 may be performed in a continuous portion of the tube segment 150 and thus, the flattened portion 164 may be a continuous portion including multiple dimples 170. In alternative embodiments, the method 250 may be performed at various lengths of the tube segment 150 such that the tube segment 150 includes multiple flattened portions 164 that each may include multiple dimples 170.

As set forth above, the tubing of the present disclosure may provide one or more technical effects useful in the operation of HVAC systems. For example, a heat exchanger may include the tubing of the present disclosure with a flattened portion that includes a plurality of dimples. The dimples may disrupt the flow of the fluid within the tubing to induce a more turbulent and slower flow to enable a greater amount of heat to exchange between the fluid flowing within the tubing to air that flows across the tubing, therefore increasing the efficiency of the heat exchanger. The flattened portion may enable a greater quantity of dimples to be indented into the tubing than a portion that is not flattened, which may further the increase efficiency of the heat exchanger. Additionally, the flattened tubing profile may decrease the resistance imposed by the heat exchanger by decreasing the area which the airflow encounters when flowing across the heat exchanger tubing. Thus, a pressure drop of the airflow may be limited. As such, less energy may be used to increase the velocity of the airflow to compensate for the pressure drop, which may reduce costs of operating the HVAC system. The flattened tubing profile may also enable drainage of liquid, such as condensation. That is, since the bottom portion of the tubing profile remains substantially aligned, liquid may flow in an unobstructed manner to exit the tubing rather than accumulate within the tubing. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A heat exchanger, comprising:
 a tube having a length and an outside boundary, the tube configured to convey fluid therethrough to facilitate heat transfer, and the outside boundary of the tube having a bottom wall portion, a top wall portion oppos- ing the bottom wall portion, and two side wall portions between the bottom wall portion and the top wall portion;
- a deformed region of the outside boundary comprising a first cross-sectional profile and a plurality of dimples formed outside of the bottom wall portion in the deformed region, wherein the bottom wall portion in the deformed region is generally flattened in a direction transverse to gravity; and
- an un-deformed region of the outside boundary extending from the deformed region, wherein the un-deformed region comprises a second cross-sectional profile, the bottom wall portion in the un-deformed region is un-deformed, the bottom wall portion in the deformed region and the bottom wall portion in the un-deformed region are aligned with one another to facilitate flow of a liquid through the tube, and a first distance between the top wall portion in the deformed region and the bottom wall portion in the deformed region is greater than a second distance between the top wall portion in the un-deformed region and the bottom wall portion in the un-deformed region.

2. The heat exchanger of claim 1, wherein the outside boundary defines an interior through which the fluid is conveyed and an exterior, and each dimple of the plurality of dimples is a deformation of the outside boundary in the deformed region from the exterior toward the interior.

3. The heat exchanger of claim 2, wherein each dimple of the plurality of dimples has a substantially oval shape and has a length greater than its width, and wherein the length is oriented perpendicular to the length of the tube.

4. The heat exchanger of claim 3, wherein the plurality of dimples is formed on the side wall portions in the deformed region.

5. The heat exchanger of claim 3, wherein the top wall portion in the un-deformed region is substantially circumferential.

6. The heat exchanger of claim 1, wherein the plurality of dimples is spaced apart along the deformed region.

7. The heat exchanger of claim 6, wherein the plurality of dimples is spaced apart equidistantly.

8. An HVAC unit comprising the heat exchanger of claim 1, comprising a burner attached to the tube.

9. A heat exchanger, comprising:
- a tube having a length and an outside boundary, the tube configured to convey fluid therethrough to transfer heat, and the outside boundary of the tube having a bottom wall portion, a top wall portion opposing the bottom wall portion, and two side wall portions between the bottom wall portion and the top wall portion, wherein a segment of the length of the tube comprises alternating regions comprising un-deformed outside boundary regions and a deformed outside boundary region, the deformed outside boundary region comprises a plurality of dimples selectively placed outside of the bottom wall portion in the deformed outside boundary region, the bottom wall portion in the deformed outside boundary region is flattened in a direction transverse to gravity, the bottom wall portion in each un-deformed outside boundary region is substantially circumferential, the bottom wall portion in the deformed outside boundary region and the bottom wall portion in each un-deformed outside boundary region are aligned with one another, and a first distance between the side wall portions in each un-deformed outside boundary region is greater than a second distance between the side wall portions in the deformed outside boundary region.

10. The heat exchanger of claim 9, wherein the un-deformed outside boundary regions do not comprise dimples.

11. The heat exchanger of claim 9, wherein the plurality of dimples is selectively placed on the side wall portions in the deformed outside boundary region.

12. The heat exchanger of claim 1, wherein the deformed region comprises a flattened geometry.

13. The heat exchanger of claim 1, wherein the first cross-sectional profile comprises an elliptical cross-sectional profile, and the second cross-sectional profile comprises a circular cross-sectional profile.

14. The heat exchanger of claim 1, wherein each of the bottom wall portion in the deformed region and the bottom wall portion in the un-deformed region is oriented at an angle with respect to a horizontal plane.

15. The heat exchanger of claim 14, wherein the angle is between 1 and 15 degrees.

16. The heat exchanger of claim 1, wherein the un-deformed region does not comprise dimples.

17. The heat exchanger of claim 1, wherein the tube is a tube segment, the un-deformed region forms an inlet of the tube segment, the heat exchanger comprises an additional un-deformed region of the outside boundary extending from the deformed region and forming an outlet of the tube segment, and the bottom wall portion in the additional un-deformed region is aligned with the bottom wall portion in the deformed region and the bottom wall portion in the un-deformed region.

* * * * *